Oct. 30, 1962 C. R. BARKLEY 3,060,761
MASTER PIN FOR ARTICULATED TRACKS
Filed Nov. 15, 1960 2 Sheets-Sheet 1
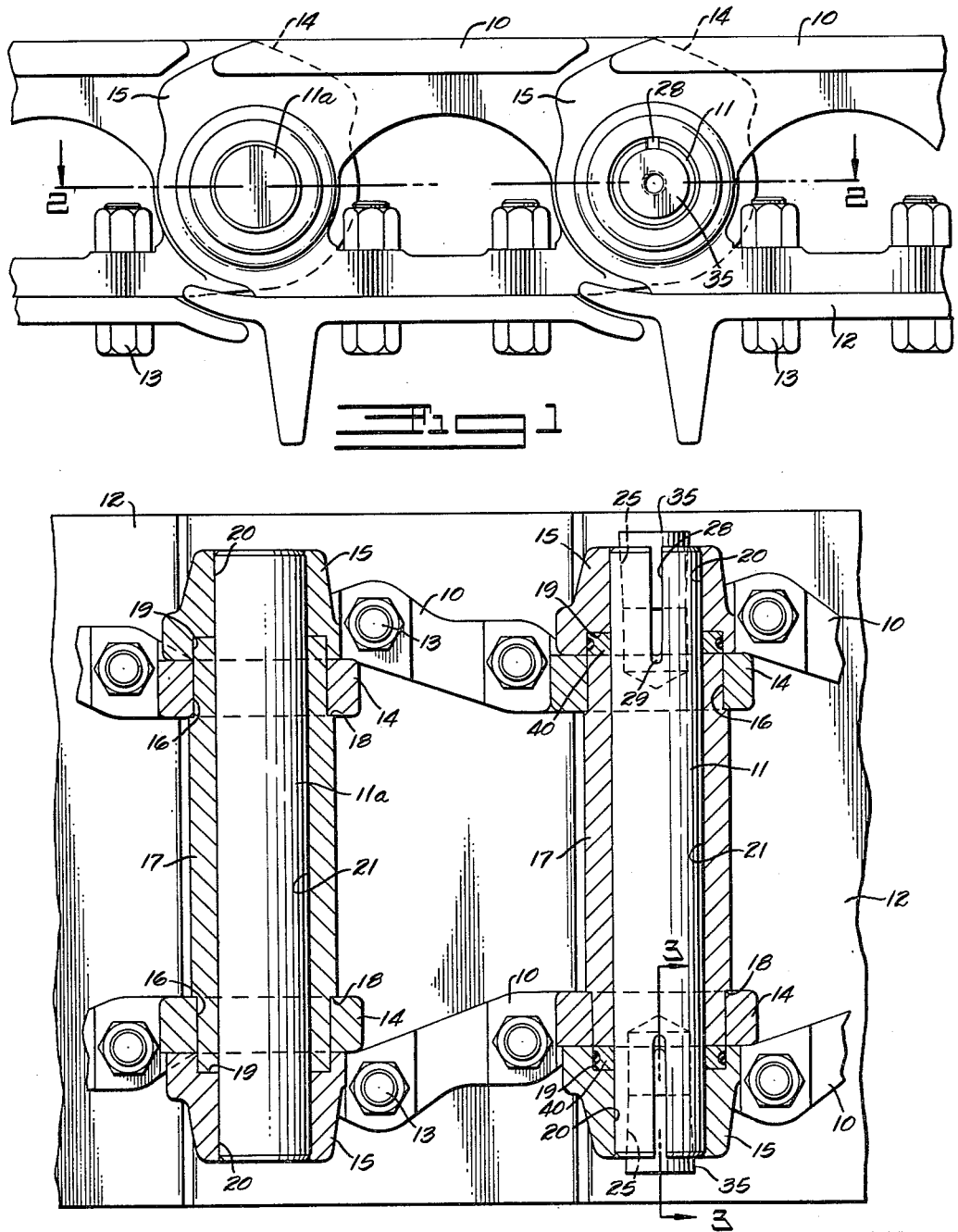
INVENTOR.
CHARLES REX BARKLEY
BY
MAHONEY, MILLER & RAMBO
BY W.S. Rambo
ATTORNEYS.

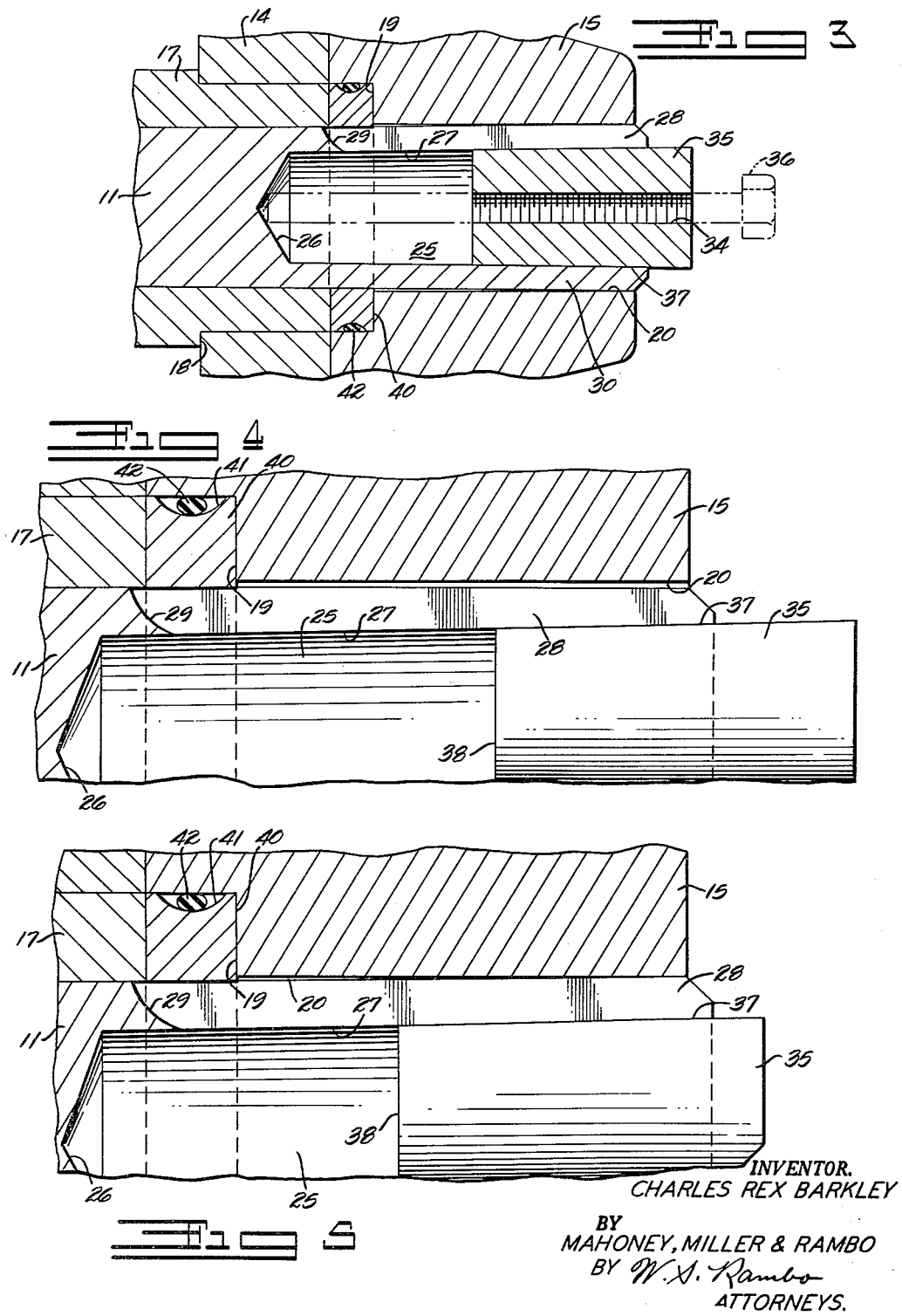

United States Patent Office 3,060,761
Patented Oct. 30, 1962

3,060,761
MASTER PIN FOR ARTICULATED TRACKS
Charles Rex Barkley, New Lexington, Ohio, assignor to Lempco Products, Inc., Bedford, Ohio, a corporation of Ohio
Filed Nov. 15, 1960, Ser. No. 69,443
9 Claims. (Cl. 74—254)

This invention relates to a master pin for articulated tracks. It has to do, more particularly, with a removable master pin used in detachably connecting the ends of an articulated track or similar articulated devices, especially of the crawler vehicle type, so as to provide a continuous track.

It has been the practice in the past to provide a master pin for connecting the adjacent ends of a crawler type track to provide a continuous track structure for a vehicle. The pin is removable so that the ends of the track can be disconnected to permit removal of the track from the vehicle for repairs or replacement of parts.

It has been proposed to provide a master pin formed of suitable metal with outwardly opening sockets in its opposed ends for receiving expander plugs, the annular wall of each of the sockets being provided with a slit or slot extending from its outer edge inwardly to the base of the socket. The tapered wall surfaces of the socket and the cooperating tapered surfaces of the expander plug are so arranged that when the plug is driven axially inwardly, the annular split wall of the socket is expanded radially outwardly so that the end of the master pin will fit tightly within the surrounding eye of the link in order to prevent axial and rotative movement of the master pin relative to the eye. With both ends of the master pin expanded in this manner, the cooperating pairs of links at the adjacent ends of the crawler track are connected together. The ends of the track can be detached, by removing the expander plugs from the sockets in the ends of the master pin and for this purpose a bolt is usually threaded through each expander plug so that it can be screwed axially inwardly into engagement with the bottom of the socket to thereby force the plug axially outwardly from the socket. This type of master pin has been found to be quite effective in detachably connecting the ends of a crawler vehicle track together. However, it has been found in practice that with the arrangement described for expanding the split ends of the master pin, there is a tendency for the metal of the pin to fracture at the closed inner end of each slit or slot due to the stresses set up at that location by the inward driving of the expander plug.

It is, therefore, the main object of this invention to provide a master pin of the general type indicated above for connecting the adjacent ends of a crawler track together but which is provided with a novel and effective arrangement for preventing fracturing of the master pin at or adjacent to the inner end of the slit or slot provided in the outwardly opening expansible socket at each end of the pin.

Another object of this invention is to provide a fracture-preventing arrangement of the type indicated which also aids in preventing the entrance of dirt or other foreign matter between the end of the master pin and the surrounding eye of the cooperating link.

Still another object of this invention is to provide a fracture-preventing arrangement of the type indicated which will also function to lock the master pin in connecting relationship to the ends of the track.

In the accompanying drawings, the master pin of this invention is shown applied to a vehicle track of the crawler type but it is to be understood that it is not limited specifically to the type of track shown.

In the drawings:
FIGURE 1 is a side elevational view of a track in which the master pin of this invention is incorporated.
FIGURE 2 is a horizontal sectional view taken along line 2—2 of FIGURE 1.
FIGURE 3 is an enlarged fragmentary vertical sectional view taken along line 3—3 of FIGURE 2.
FIGURE 4 is a diagrammatic view similar to FIGURE 3 but showing the master pin expander plug in its initially inserted position in the plug-receiving socket of the master pin.
FIGURE 5 is a view similar to FIGURE 4 but showing the plug driven into its final master-pin expanding position in the socket.

With specific reference to the drawings, this invention is shown applied to a crawler vehicle track which includes sets of transversely spaced links 10 pivotally joined at their ends with identical sets of links by transverse pins 11a. The sets of links 10 which define the ends of the track are pivoted or hinged together by a removable master pin 11 to form a continuous track. The track includes the ground-engaging shoes 12 which are carried transversely on the individual sets of links 10, being bolted thereto by the bolts 13.

As shown in FIG. 2, each of the links 10 is formed at one end thereof with an inner eye portion 14 and at its opposite end with an outer eye portion 15, and when assembled, the outer eye portions 15 of one set of links are disposed in transversely overlapping registry with the inner eye portions 14 of an adjoining set of links. The inner eyes 14 are formed with bores or openings 16 extending shoulders 18 engaging the inner surfaces of the inner eye portions 14 therethrough and has its opposed outer end extending into counterbore recesses 19 formed at the inner ends of annular bores or pin-receiving eyes 20 which extend axially through the outer eye portions 15. The outer ends of the bushing 17 are non-rotatably secured within the openings 16 of the inner eye portions 14 as by press-fitting but the extremities thereof are rotatable in the counterbores 19 in the outer eye portions 15. The usual pivot pins 11a are rotatable within the axial bores 21 of the bushings 17, but have their outer end portions press fitted into the bores 20 of the outer eye portions 15 of the links. Thus, the bushings 17 and the inner eye portions 14 of the links are free to pivot on the pins 11a relative to the outer eye portions 15 of an adjoining set of links.

The master pin 11 is of solid cylindrical form throughout the greater portion of its length and, when properly positioned in the aligned openings of the overlapping sets of links, will terminate at the outer surfaces of the outer eye portions 15 of the links, as shown in FIGURE 2. When so positioned, the master pin 11 will serve to pivotally and detachably connect the respective ends of the crawler track. The individual links 10 which comprise the respective end links of the track need not be modified in any way to receive the master pin 11 but may be of the usual form as indicated.

The opposed ends of the master pin 11 are provided with expander plug arrangements for expanding the split ends of the pin radially outwardly into tight frictional contact with the surrounding outer eye portions 15 of the links. For this purpose, each end of the pin 11 is provided with an axially disposed plug-receiving socket 25 which opens outwardly of the pin and terminates in a conical bottom or base wall 26. The socket 25 is defined by an annular inner wall surface 27 which tapers so that the socket is of gradually decreasing diameter from its outer open end to its base 26. Each end of the pin 11 is provided with the slit or slot 28 which extends longitudinally inwardly from the outer end of the pin 11 to a position just short of the base wall 26 of the socket 25 and terminates in a curved or outwardly diverging end wall 29 which is spaced outwardly of the base 26 of the socket. Thus, the socket 25 is defined in part by a split annular wall 30, having the tapering inner surface 27.

An expander plug 35 is provided for insertion into each socket 25 through its outer open end. This expander plug is of annular cross-sectional form and is provided with the tapering outer surface 37 which is at the same angle of taper as the wall surface 27 of the socket 25. Thus, as shown in FIGURE 4, when the plug 35 is inserted in the socket 25, its tapering surface 37 contacts the tapering surface 27 of the socket. The diameter of the plug 35 is such that when it is initially positioned in the socket 25 by merely inserting it without force, it will occupy the position indicated in FIGURE 4, where it will extend into the socket for a suitable distance and its outer end will project therefrom a substantial distance. The complemental tapering surfaces 37 and 27 will, however, have substantial surface areas in contact which will increase when the plug 35 is driven inwardly. If the plug 35 is now driven axially inwardly, for example, into the position shown in FIGURE 5, the split wall 30 of the socket will be expanded by the plug 35 normally into firm contact with the surrounding wall of the opening 20 in the link end 15. At this time, the inner end 38 of the plug 35 will still be spaced axially outwardly of the base 26 of the socket and outwardly of the closed end 29 of the slot 28. It will be apparent that, for purposes of illustration, tolerances are exaggerated in FIGURES 4 and 5.

It will be apparent that forcing of the expander plug 35 axially inwardly into the opening 25 will set up considerable stresses at the inner end of the slot 28. To prevent these stresses from splitting or fracturing the metal of the pin 11 adjacent the closed end of the slot 28 and to lock the pin against axial movement, a novel and effective arrangement is provided. This arrangement comprises a continuous retaining collar or band 40 which is provided at each end of the pin and which is spaced outwardly from the extremity of the closed end 29 of the associated slot 28. This locking and stress-resisting collar 40 is of such a size that it will fit snugly on the collapsed or non-expanded master pin 11 with practically no clearance so as to prevent expansion of the socket wall at this location. Each collar 40 is positioned in the recess or counterbore 19 at the inner end of the eye opening 20. For this reason, the ends of the bushing 17 which surrounds the pin 11 are foreshortened so as to terminate flush with the outer surfaces of the inner eye portions 14 of the end set of links. The closed or continuous collar or band 40 is of a size complemental to the counterbore recess 19 and is of substantially square transverse cross-section so that it will fit snugly therein. Thus, when the master pin 11 is positioned as shown in FIGURE 2, to connect the adjacent sets of links together, the bands or collars 40, which are preferably of steel, will be confined in the recesses 19. Therefore, when the expander plugs 35 are driven axially inwardly to expand the split walls 30 radially outwardly and normally into contact with the walls of the openings 20, the collars will be in position to resist splitting or fracturing forces in the metal at the inner closed end 29 of the slot 28 in the pin 11, which is also usually of steel.

The outer annular surface of the band 40 is preferably provided with a groove or channel 41 of arcuate transverse shape extending completely around the collar 40. This channel 41 may receive a sealing ring 42 of the O-ring type so as to provide a seal at the ends of the associated bushing 17 to prevent entrance of dirt at this joint.

Thus, with the plugs 35 driven into pin-expanding positions, as shown in FIGURES 2 and 5, the ends of the master pin 11 will be expanded in such a manner that both axial and rotative movement of the master pin relative to the outer eye portions 15 of the end links normally will be precluded. However, the master pin 11 will be free to rotate in the cooperating bushing. The collars 40 will rotate with the pin 11 and within the counterbores 19. The collars 40 will prevent fracturing of the pin 11 at the inner ends of the slots 28 and will prevent any radial expansion of the pin inwardly beyond the collar which would tend to intefere with rotation of the pin 11 in the cooperating bushing 17.

In preventing this expansion of the intermediate body portion of the master pin, the collar becomes rigidly locked to the master pin. At the same time, the collars permit sufficient radial expansion of the split end portions of the master pin to enable the same to tightly engage the eyes 20 of the links even if such eyes have become oversize due to ordinary wear or distortion.

In order to remove the master pin to permit detaching of the ends of the track, an arrangement illustrated in FIGURE 3 is preferably provided. Thus, each plug 35 is provided with a threaded bore 34 extending axially completely therethrough and designed to receive a threaded back-out bolt 36. It will be apparent that the bolt 36 can be screwed axially inwardly through the bore 34 so that its inner end will engage the base 26 of the socket 25, as indicated by broken lines in FIGURE 3. Continued rotation of the bolt 36 will forcibly back the plug 35 axially outwardly of the socket 25. This will permit contraction of the associated split walls 30 on the ends of the pin 11 and axial removal of the pin from the associated links. Thus, detachment of the ends of the crawler track may be easily accomplished.

It will be apparent that this invention provides a master pin which can be used for detachably and pivotally connecting the overlapping ends of a crawler vehicle track for normal articulating movement. The cylindrical master pin can be easily inserted in connecting position relative to the cylindrical openings of adjacent sets of links and its split ends can then be readily expanded so that the pin will remain in connecting or hinging position. The stress-resisting and locking band or collar, associated with the inner end of the slit or slot in the outer end of the master pin, will prevent fracturing of the metal at the inner end of the slot or slit. No modification of the link ends will be required to adapt the master pin of this invention to the links.

The most important feature of this invention is the immediate binding of each collar on the master pin upon extremely slight expansion of the split end of the pin. Each collar fits on the associated collapsed split end of the master pin with practically no tolerance or even slight interference so that zero or very slight expansion of the master pin binds the collar thereto. The collars prevent expansion of the metal of the pin where fractures tend to start and also serve to lock the pin against axial movement.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a link structure comprising relatively adjoining sets of links having overalpping inner and outer end portions formed with axially aligned cylindrical openings, a master pin having an elongated cylindrical body extending through said openings to hingedly connect the links of the respective sets together, said master pin having end portions disposed in the cylindrical openings in the outer link end portions, said pin end portions having opposed outwardly opening axially disposed sockets therein with split walls, expander plugs positioned in said sockets to expand said walls, and stress-resisting and locking collars disposed within the openings of the outer end portions of said links and around said pin end portions adjacent the inner ends of said split walls.

2. The combination of claim 1 in which a bushing is provided in surrounding relationship to the cylindrical body of said master pin and has its opposed ends disposed in said cylindrical openings of the inner end portions of the links, said cylindrical openings in the outer end portions of the links having counterbore recesses at their inner ends for receiving said stress-resisting collars.

3. The combination of claim 2 in which said collars carry sealing rings engaging associated surfaces of said counterbore recesses.

4. In combination with a link structure comprising relatively adjoining sets of links having overlapping inner and outer end portions formed with axially aligned cylindrical openings, a master pin having an elongated cylindrical body extending through said openings to hingedly connect the links of the respective sets together and having end portions disposed in the cylindrical openings in the outer link end portions, a bushing surrounding said cylindrical body of the master pin and having its opposed ends disposed in said cylindrical openings of the inner end portions of the links, said cylindrical openings in the outer end portions of the links having counterbore recesses at their inner ends, collars disposed within said recesses adjacent the ends of said bushing, said collars carrying sealing rings which engage adjacent surfaces of said counterbore recesses.

5. In combination with a crawler vehicle track having relatively adjoining sets of links formed with relatively overlapping inner and outer eyes; a master pin for detachably and hingedly connecting said sets of links comprising an elongated cylindrical body extending axially through the relatively overlapping eyes of said sets of links and formed at the opposite ends thereof with outwardly opening, split wall sockets extending axially a distance inwardly from the ends of said body, the sockets of said pin being disposed generally within the outer eyes of said links, expander plugs positioned in said sockets and movable therein to positions expanding the split end portions of said body radially into tight-fitting engagement with the outer eyes of said links, and an annular stress-resisting collar closely encircling the periphery of said body adjacent the inner end of each of said split wall sockets for resisting fracture of said body upon radial expansion of the split end portions thereof.

6. The combination defined in claim 5, wherein said expander plugs are each formed with a screw-threaded axial bore for the reception of a cooperatively threaded back-out bolt.

7. The combination defined in claim 5, wherein said stress-resisting collars are arranged within counterbores formed in the outer eyes of said links and each of said collars is formed with a peripheral groove for the reception of a sealing ring.

8. The combination defined in claim 5, wherein the sockets of said body and said expander plugs are cooperatively tapered.

9. In combination with a crawler vehicle track, comprising relatively adjoining sets of links having overlapping inner and outer end portions formed with axially aligned cylindrical openings; an elongated, cylindrical master pin having opposite end portions extending through said openings to hingedly connect the overlapping end portions of said sets of links, at least one end portion of said pin being formed with an outwardly opening, split wall socket extending axially through the opening formed in an outer end portion of one of said links; an expander plug positioned in said socket and movable therein to exand the split wall thereof; and an annular stress-resisting collar disposed within the opening of the outer end portion of said last-named link and snuggly encircling said pin adjacent the inner end of the split wall of said socket to limit expansion of the latter.

References Cited in the file of this patent

UNITED STATES PATENTS

| | | |
|---|---|---|
| 2,168,053 | Starr et al. | Aug. 1, 1939 |
| 2,332,408 | Stenger | Oct. 19, 1943 |
| 2,699,974 | Deffenbaugh | Jan. 18, 1955 |
| 2,823,081 | Mayo | Feb. 11, 1958 |
| 2,893,788 | Yerian | July 7, 1959 |